US011962081B2

(12) United States Patent
Nakajima et al.

(10) Patent No.: US 11,962,081 B2
(45) Date of Patent: Apr. 16, 2024

(54) ANTENNA DEVICE

(71) Applicant: Mitsubishi Electric Corporation, Tokyo (JP)

(72) Inventors: Hiromasa Nakajima, Tokyo (JP); Shinichi Yamamoto, Tokyo (JP); Michio Takikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 296 days.

(21) Appl. No.: 17/386,366

(22) Filed: Jul. 27, 2021

(65) Prior Publication Data

US 2021/0359403 A1 Nov. 18, 2021

Related U.S. Application Data

(63) Continuation of application No. PCT/JP2019/009007, filed on Mar. 7, 2019.

(51) Int. Cl.
*H01Q 1/42* (2006.01)
*H01Q 3/26* (2006.01)
*H01Q 15/00* (2006.01)

(52) U.S. Cl.
CPC ............... *H01Q 1/422* (2013.01); *H01Q 3/26* (2013.01); *H01Q 15/0026* (2013.01)

(58) Field of Classification Search
CPC ........... H01Q 1/42; H01Q 1/422; H01Q 1/421
See application file for complete search history.

(56) References Cited

U.S. PATENT DOCUMENTS

| | | | |
|---|---|---|---|
| 2,854,668 A | 9/1958 | McMillan et al. | |
| 8,681,064 B2 * | 3/2014 | Isom | H01Q 17/00 343/753 |
| 2002/0067314 A1 * | 6/2002 | Takimoto | H01Q 3/14 343/711 |

(Continued)

FOREIGN PATENT DOCUMENTS

| | | |
|---|---|---|
| JP | 59-6312 U | 1/1984 |
| JP | 63-300608 A | 12/1988 |

(Continued)

OTHER PUBLICATIONS

International Search Report for PCT/JP2019/009007 dated Apr. 2, 2019.

(Continued)

*Primary Examiner* — Seokjin Kim
(74) *Attorney, Agent, or Firm* — Birch, Stewart, Kolasch & Birch, LLP

(57) ABSTRACT

An antenna and a radome that covers the antenna are provided, the radome includes a first part, a second part, and a third part each with a surface which is flush to each other, the first part has a beam transmission characteristic corresponding to a scanning angle of 0 degrees of a beam emitted by the antenna with an emission direction directed toward the first part, the second part has a beam transmission characteristic corresponding to a first scanning angle of a beam emitted by the antenna with an emission direction directed toward the second part, and the third part has a beam transmission characteristic corresponding to a second scanning angle of a beam emitted by the antenna with an emission direction directed toward the third part.

7 Claims, 12 Drawing Sheets

(56) References Cited

U.S. PATENT DOCUMENTS

| | | | | |
|---|---|---|---|---|
| 2010/0019978 | A1* | 1/2010 | Okada | H01Q 19/062 343/702 |
| 2010/0039346 | A1* | 2/2010 | Peter | H01Q 1/421 342/368 |
| 2012/0038539 | A1* | 2/2012 | Chang | H01Q 5/22 343/872 |
| 2012/0127057 | A1 | 5/2012 | Yamamoto et al. | |
| 2014/0091969 | A1* | 4/2014 | Shi | G01S 13/02 342/385 |
| 2016/0344095 | A1* | 11/2016 | Tagi | G01S 13/58 |
| 2017/0346177 | A1* | 11/2017 | Nagata | H01Q 21/065 |
| 2018/0159207 | A1* | 6/2018 | Shurish | H01Q 1/421 |
| 2019/0271762 | A1* | 9/2019 | Sakai | G01S 13/93 |
| 2020/0076069 | A1* | 3/2020 | Tanabe | H01Q 1/422 |
| 2020/0328524 | A1* | 10/2020 | Deng | H01Q 19/06 |

FOREIGN PATENT DOCUMENTS

| | | | | |
|---|---|---|---|---|
| JP | 3-10407 | A | | 1/1991 |
| JP | 2018-17552 | A | | 2/2018 |
| JP | 2018-137563 | A | | 8/2018 |
| WO | WO 2011/033935 | A1 | | 3/2011 |
| WO | WO-2020261511 | A1 | * | 12/2020 |
| WO | WO-2022152805 | A1 | * | 7/2022 |

OTHER PUBLICATIONS

Extended European Search Report dated Jan. 19, 2022 in the corresponding European Patent Application No. 19918211.4.

* cited by examiner

ANTENNA DEVICE

CROSS REFERENCE TO RELATED APPLICATION

This application is a Continuation of PCT International Application No. PCT/JP2019/009007, filed on Mar. 7, 2019, which is hereby expressly incorporated by reference into the present application.

TECHNICAL FIELD

The present invention relates to an antenna device including a radome covering the antenna.

BACKGROUND ART

The antenna may be equipped with a radome that covers a beam emitting surface to protect it from the external environment such as wind, rain or dust. However, in a general radome with a uniform thickness, it is known that since the beam transmission characteristic changes corresponding to an incident angle of a beam emitted by the antenna toward the radome, the attenuation of a beam intensity of a beam emitted by the antenna at a scanning angle other than a specific scanning angle is larger than that of a beam emitted at the specific scanning angle. Therefore, it is necessary to suppress the attenuation of the beam intensity depending on the scanning angle of the beam in the radome.

There is a technique for changing the thickness of the radome in the middle in order to suppress the attenuation of the beam intensity depending on the scanning angle of the beam in the radome. For example, the antenna device described in Patent Literature 1 has a structure in which the thickness of the radome is ½ wavelength or ¼ wavelength in a narrower-angle direction than a predetermined direction when viewed from the antenna, and the thickness of the radome in a wider-angle direction than a predetermined direction when viewed from the antenna is thicker than the thickness of the radome in the narrow-angle direction. Therefore, in the antenna device, one surface of the radome has a step.

CITATION LIST

Patent Literature

Patent Literature 1: JP 2018-137563A

SUMMARY OF INVENTION

Technical Problem

When a step is provided on the surface of the radome, it is strongly affected by the external environment such as air resistance or thermal deformation depending on the intended use of the antenna device. Further, limiting the thickness of the radome in the narrower-angle direction than the predetermined direction when viewed from the antenna is a constraint on the design of the antenna device. Further, if the thickness of the radome in the narrow-angle direction is set to the thickness of ½ wavelength or ¼ wavelength of a high frequency band such as millimeter wave, there is a problem that the mechanical strength of the radome is weakened.

The present invention has been made to solve the above-mentioned problems, and has an object to suppress the attenuation of the beam intensity depending on the scanning angle of the beam in the radome without providing a step on the surface of the radome in an antenna device provided with the radome covering the antenna.

Solution to Problem

The antenna device according to the present invention includes an antenna and a radome that covers the antenna, in which the radome includes a first part, a second part and a third part each with a surface which is flush to each other, the first part has a beam transmission characteristic corresponding to a scanning angle of 0 degrees of a beam emitted by the antenna with an emission direction directed toward the first part, the second part has a beam transmission characteristic corresponding to a first scanning angle of a beam emitted by the antenna with an emission direction directed toward the second part, and the third part has a beam transmission characteristic corresponding to a second scanning angle of a beam emitted by the antenna with an emission direction directed toward the third part, wherein: the antenna is a planar antenna; and the second part is adjacent to one end of the first part, and the third part is adjacent to the other end of the first part, and, wherein: each of the first part, the second part, and the third part is composed of one or more layers; the first part and the second part differ in at least one or more of a number of layers, and a thickness of each layer when the one or more layers are a plurality of layers, and thus differ in the beam transmission characteristic; and the first part and the third part differ in at least one or more of a number of layers, and a thickness of each layer when the one or more layers are a plurality of layers, and thus differ in the beam transmission characteristic.

Advantageous Effects of Invention

In an antenna device provided with a radome covering the antenna, it is possible to suppress the attenuation of the beam intensity depending on the scanning angle of the beam emitted by the antenna in the radome without providing a step on the surface of the radome.

DESCRIPTION OF EMBODIMENTS

Hereinafter, in order to explain this invention in more detail, embodiments for carrying out the present invention will be described by referring to the accompanying drawings.

First Embodiment

Figure 1A:
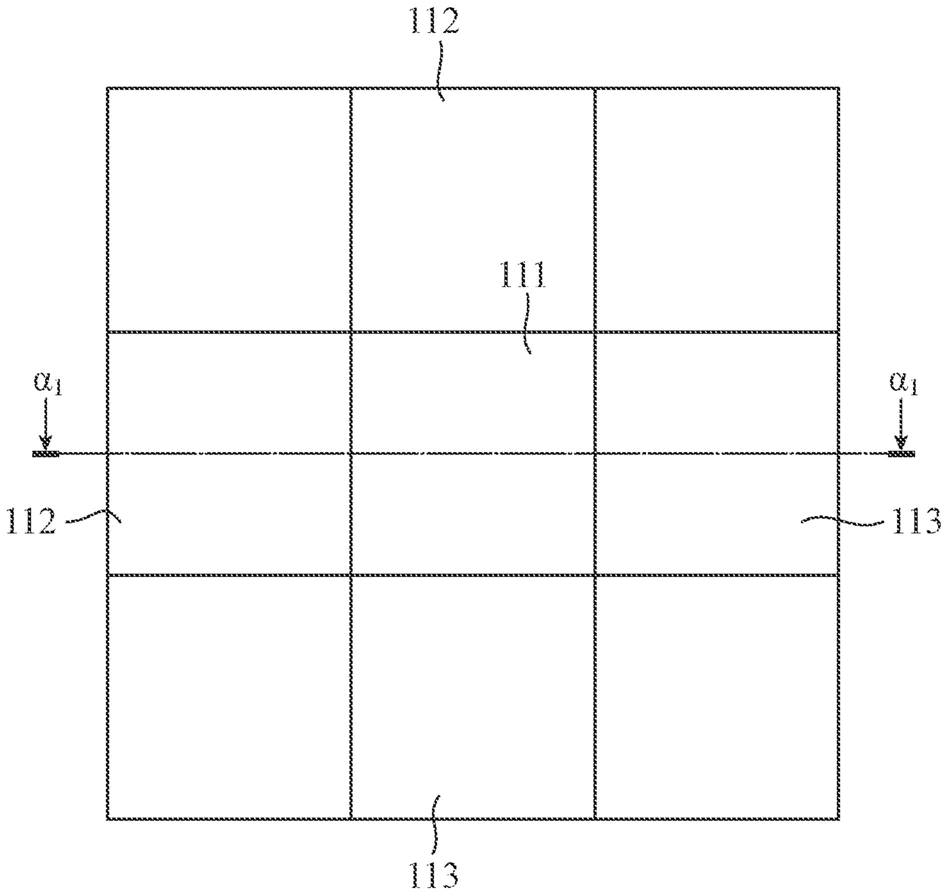
FIG. 1A is a plan view showing a configuration of an antenna device according to a first embodiment.
Figure 1B:
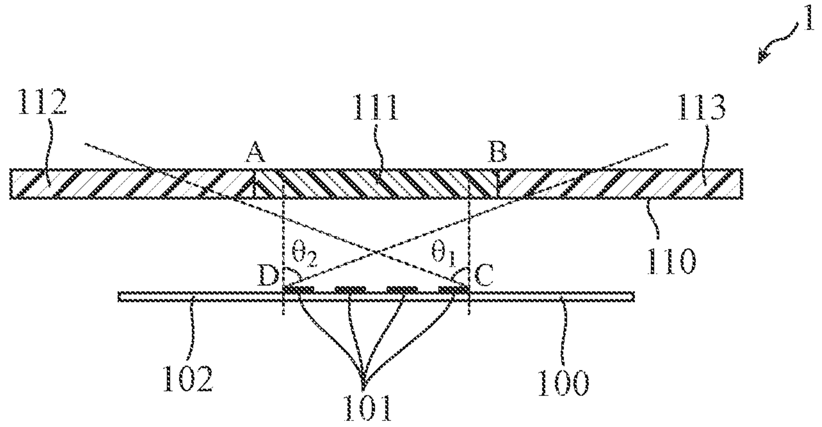
FIG. 1B is a cross-sectional view showing the configuration of the antenna device according to the first embodiment.

FIG. 1A is a plan view showing the configuration of an antenna device 1 according to a first embodiment. FIG. 1B is a cross-sectional view of the antenna device 1 whose cross section is a plane cut along a dotted line $\alpha 1$ of FIG. 1A. As shown in FIGS. 1A and 1B, the antenna device 1 includes a planar antenna 100 and a radome 110 that covers the planar antenna.

The radome 110 includes a first part 111, a second part 112, and a third part 113 which are flush with each other. More specifically, the second part 112 is adjacent to one end A of the first part and the third part 113 is adjacent to the other end B of the first part. Note that, the second part 112 and the third part 113 can be integrally formed together with each part of the radome 110 other than the first part 111 so as to surround the first part 111.

The planar antenna 100 includes a dielectric substrate 102 and a plurality of antenna elements 101 installed side by side on the dielectric substrate 102. The planar antenna 100 emits a beam toward the radome 110 from a beam emitting surface composed of the surfaces of the plurality of antenna elements 101. The planar antenna 100 can change the emission direction of the beam by changing the scanning angle of the beam by using a plurality of antenna elements 101. Note that, in the present embodiment, the configuration in which the planar antenna 100 is used as the antenna covered by the radome 110 will be described, but the antenna covered by the radome 110 may be an antenna capable of changing the beam emission direction, and is not limited to the configuration.

As a detailed arrangement of the first part 111, the second part 112, and the third part 113 of the radome 110 and the planar antenna 100, the first part 111 is located in a direction of a scanning angle of 0 degrees with respect to the planar antenna 100, the second part 112 is located in a direction of a first scanning angle $\theta_1$ with respect to the planar antenna 100, and the third part 113 is located in a direction of a second scanning angle $\theta_2$ with respect to the planar antenna 100. More specifically, one end A of the first part 111 is located in a direction of a scanning angle narrower than the first scanning angle $\theta_1$ with respect to one end C of the beam emitting surface composed of the surfaces of the plurality of antenna elements 101 included in the planar antenna 100, and the other end B of the first part 111 is located in a direction of a scanning angle narrower than the second scanning angle $\theta_2$ with respect to the other end D of the planar antenna 100. Note that, in the specification of the present application, the scanning angle of the beam emitted by the planar antenna 100 is a scanning angle using a line orthogonal to a beam emitting surface of the planar antenna 100 and the surface of the first part 111 facing the beam emitting surface as a reference line, and it is assumed that the scanning angle on the second part 112 side is a positive scanning angle, and the scanning angle on the third part 113 side is a negative scanning angle.

In the present embodiment, as described above, the size of the first part 111 is defined by the first scanning angle $\theta_1$ and the second scanning angle $\theta_2$, but the size of the first part 111 may be defined by the size of the beam emitting surface of the planar antenna 100. In that case, for example, the first part 111 has a surface facing the beam emitting surface of the planar antenna 100, and the size of the surface of the first part 111 is equivalent to or larger than the size of the beam emitting surface of the planar antenna.

Hereinafter, the beam transmission characteristics of the first part 111, the second part 112, and the third part 113 of the radome 110 will be described. The first part 111 of the radome 110 has a beam transmission characteristic corresponding to a scanning angle of 0 degrees of a beam emitted by the planar antenna 100 with an emission direction directed toward the first part 111. Note that, the "beam transmission characteristic" means the ease of transmission of the beam incident from a specific direction in the radome 110. Further, "the first part 111 has a beam transmission characteristic corresponding to a scanning angle of 0 degrees" means that the first part 111 has a characteristic of more easily transmitting a beam when the planar antenna 100 emits the beam at a scanning angle of 0 degrees than when the planar antenna 100 emits a beam at a scanning angle other than 0 degrees.

The second part 112 of the radome 110 has a beam transmission characteristic corresponding to the first scanning angle $\theta_1$ of the beam emitted by the planar antenna 100 with the emission direction directed toward the second part 112. The third part 113 of the radome 110 has a beam transmission characteristic corresponding to the second scanning angle $\theta_2$ of the beam emitted by the planar antenna 100 with the emission direction directed toward the third part 113.

More specifically about the beam transmission characteristics of the first part 111, the second part 112, and the third part 113, each of the first part 111, the second part 112, and the third part 113 is composed of one or more layers. The first part 111 and the second part 112 differ in at least one or more of the number of layers, the material of the layer, and the thickness of each layer when the one or more layers are a plurality of layers, and thus differ in the beam transmission characteristic. The first part 111 and the third part 113 differ in at least one or more of the number of layers, the material of the layer, and the thickness of each layer when the one or more layers are a plurality of layers, and thus differ in the beam transmission characteristic. An example of the material of the layer is a dielectric or the like. Note that, the number of layers, the material of the layer, and the thickness of each layer when the one or more layers are a plurality of layers can be the same in the second part 112 and the third part 113. In that case, the beam transmission characteristic of the second part 112 and the beam transmission characteristic of the third part 113 are the same.

Figure 2A:
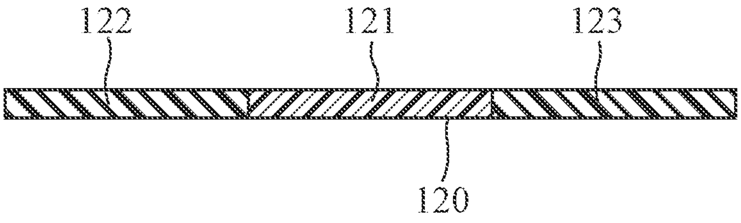
FIG. 2A is a cross-sectional view of a radome according to a first specific example of the first embodiment.

Next, a specific example of the radome 110 according to the first embodiment will be described by referring to the drawings. FIG. 2A is a cross-sectional view of a radome 120 according to a first specific example of the first embodiment. As shown in FIG. 2A, each of a first part 121, a second part 122, and a third part 123 of the radome 120 is composed of one layer. In the first specific example, the first part 121 and the second part 122 differ in the material of the layer, and thus differ in the beam transmission characteristic. Further, similarly, the first part 121 and the third part 123 differ in the material of the layer, and thus differ in the beam transmission characteristic.

Figure 2B:
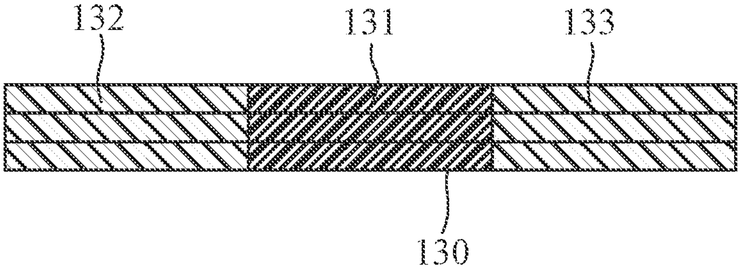
FIG. 2B is a cross-sectional view of a radome according to a second specific example of the first embodiment.

FIG. 2B is a cross-sectional view of a radome 130 according to a second specific example of the first embodiment. As shown in FIG. 2B, each of a first part 131, a second part 132, and a third part 133 of the radome 130 is composed of three layers. In the second specific example, the first part 131 and the second part 132 differ in the material of any one or more layers of the three layers, and thus differ in the beam transmission characteristic. Further, similarly, the first part 131 and the third part 133 differ in the material of any one or more layers of the three layers, and thus differ in the beam transmission characteristic.

Figure 2C:
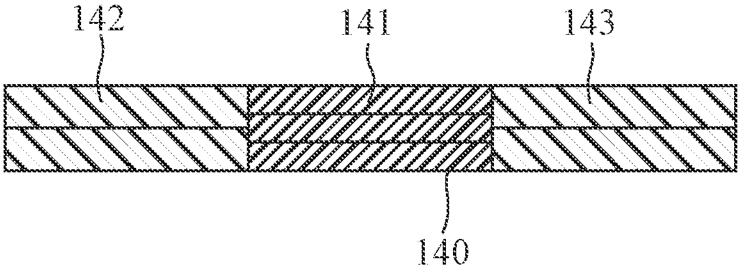
FIG. 2C is a cross-sectional view of a radome according to a third specific example of the first embodiment.

FIG. 2C is a cross-sectional view of a radome 140 according to a third specific example of the first embodiment. As shown in FIG. 2C, a first part 141 of the radome 140 is composed of three layers, and each of a second part 142 and a third part 143 is composed of two layers. In the third specific example, the first part 141 and the second part 142 differ in the material of layer, the number of layers, and the thickness of each layer, and thus differ in the beam transmission characteristic. Further, similarly, the first part 141 and the third part 143 differ in the material of layer, the number of layers, and the thickness of each layer, and thus differ in the beam transmission characteristic.

Figure 2D:
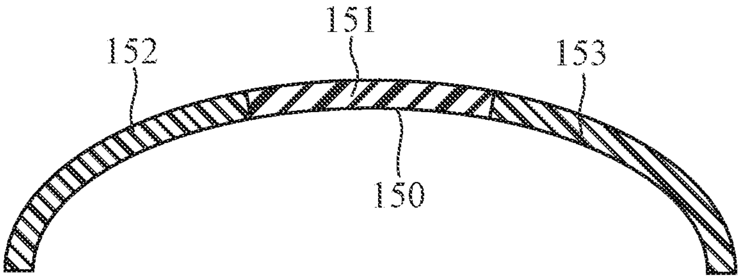
FIG. 2D is a cross-sectional view of a radome according to a modified example of the first embodiment.

FIG. 2D is a cross-sectional view of a radome 150 according to a modified example of the first embodiment. As shown in FIG. 2D, each of a first part 151, a second part 152, and a third part 153 of the radome 150 is composed of one curved layer. In the drawing of each of the above specific examples, a planar radome is shown, but as in the radome 150 of FIG. 2D, the radome covering the planar antenna 100 may be curved. Also, the curvature of the curve of such a radome can be any value.

As described above, the antenna device 1 according to the first embodiment includes a planar antenna 100 as an antenna and a radome covering the planar antenna 100, and the radome 110 includes a first part 111, a second part 112, and a third part 113 each with a surface which is flush to each other, the first part 111 has a beam transmission characteristic corresponding to a scanning angle of 0 degrees of the beam emitted by the planar antenna 100 with an emission direction directed toward the first part 111, the second part 112 has a beam transmission characteristic corresponding to a first scanning angle $\theta_1$ of the beam emitted by the planar antenna 100 with the emission direction directed toward the second part 112, and the third part 113 has a beam transmission characteristic corresponding to a second scanning angle $\theta_2$ of the beam emitted by the planar antenna 100 with the emission direction directed toward the third part 113.

According to the above configuration, the surfaces of the first part 111, the second part 112, and the third part 113 are flush with each other. Further, the first part 111 suppresses the attenuation of the beam intensity when the planar antenna 100 emits a beam at a scanning angle of 0 degrees. The second part 112 suppresses the attenuation of the beam intensity when the planar antenna 100 emits a beam at the first scanning angle. The third part 113 suppresses the attenuation of the beam intensity when the planar antenna 100 emits a beam at the second scanning angle. This makes it possible to suppress the attenuation of the beam intensity depending on the scanning angle of the beam in the radome without providing a step on the surface of the radome.

Further, in the antenna device 1 according to the first embodiment, each of the first part 111, the second part 112, and the third part 113 is composed of one or more layers, and the first part 111 and the second part 112 differ in at least one or more of the number of layers, the material of the layer, and the thickness of each layer when the one or more layers are a plurality of layers, and thus differ in the beam transmission characteristic, and the first part 111 and the third part 113 differ in at least one or more of the number of layers, the material of the layer, and the thickness of each layer when the one or more layers are a plurality of layers, and thus differ in the beam transmission characteristic.

According to the above configuration, at least one or more of the number of layers, the material of the layer, and the thickness of each layer when the one or more layers are a plurality of layers are made different from each other, and thereby it is possible to suppress the attenuation of the beam intensity depending on the scanning angle of the beam in the radome without providing a step on the surface of the radome.

Further, in the antenna device 1 according to the first embodiment, the antenna is a planar antenna 100, the second part 112 is adjacent to one end A of the first part 111, and the third part 113 is adjacent to the other end B of the first part 111.

According to the above configuration, in a region adjacent to one end A of the first part 111, the second part 112 covers the planar antenna 100, and in a region adjacent to the other end B of the first part 111, the third part 113 covers the planar antenna 100. This makes it possible to suppress the attenuation of the beam intensity of the beam emitted toward these regions while protecting the planar antenna 100 from the external environment such as wind, rain or dust from the region adjacent to one end A of the first part 111 and the region adjacent to the other end B of the first part 111.

Further, in the antenna device 1 according to the first embodiment, the first part 111 is located in the direction of a scanning angle of 0 degrees with respect to the planar antenna 100, the second part 112 is located in the direction of the first scanning angle $\theta_1$ with respect to the planar antenna 100, and the third part 113 is located in the direction of the second scanning angle $\theta_2$ with respect to the planar antenna 100.

According to the above configuration, the first part 111 is disposed so as to suppress the attenuation of the beam intensity when the planar antenna 100 emits a beam in the direction of a scanning angle of 0 degrees. The second part 112 is disposed so as to suppress the attenuation of the beam intensity when the planar antenna 100 emits a beam in the direction of the first scanning angle. The third part 113 is disposed so as to suppress the attenuation of the beam intensity when the planar antenna 100 emits a beam in the direction of the second scanning angle. This makes it possible to suppress the attenuation of the beam intensity depending on the scanning angle of the beam in the radome.

Second Embodiment

The second embodiment will be described below by referring to the drawings. Note that, the same reference numerals are given to the configurations having the same functions as those described in the first embodiment, and the description thereof will be omitted.

In the first embodiment, the configuration in which the radome 110 includes three parts, the first part 111, the second part 112, and the third part 113, has been described. In the second embodiment, a configuration in which a radome 210 further includes one or more parts each having a surface flush with each surface of a first part 211, a second part 212, and a third part 213 will be described.

Figure 3A:
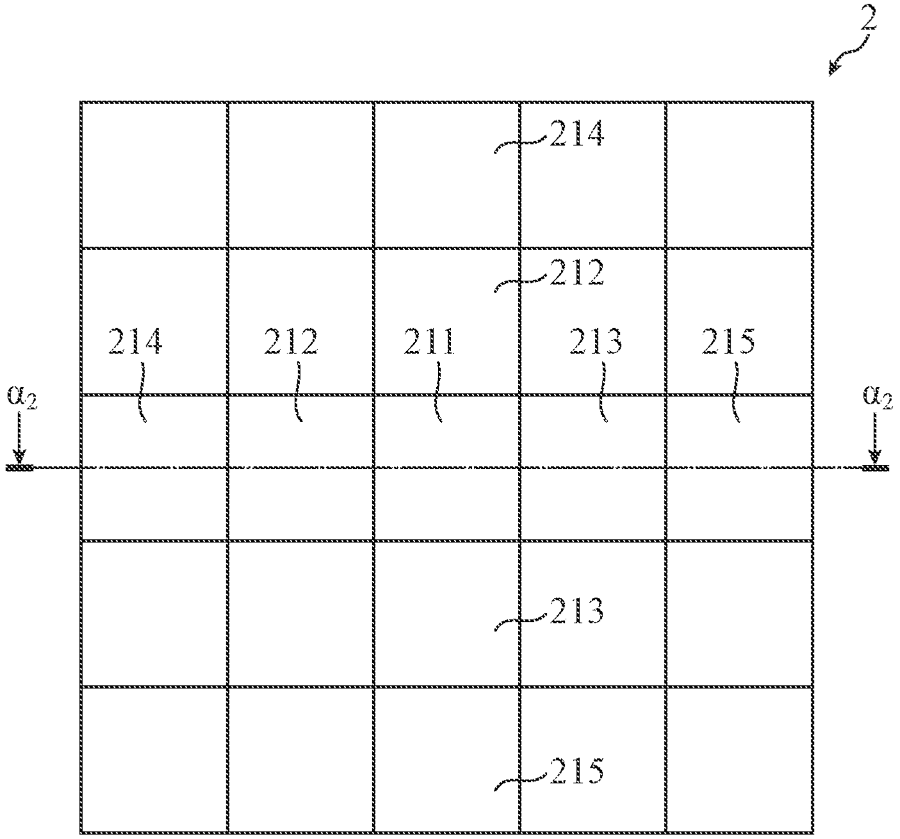
FIG. 3A is a plan view showing a configuration of an antenna device according to a second embodiment.
Figure 3B:
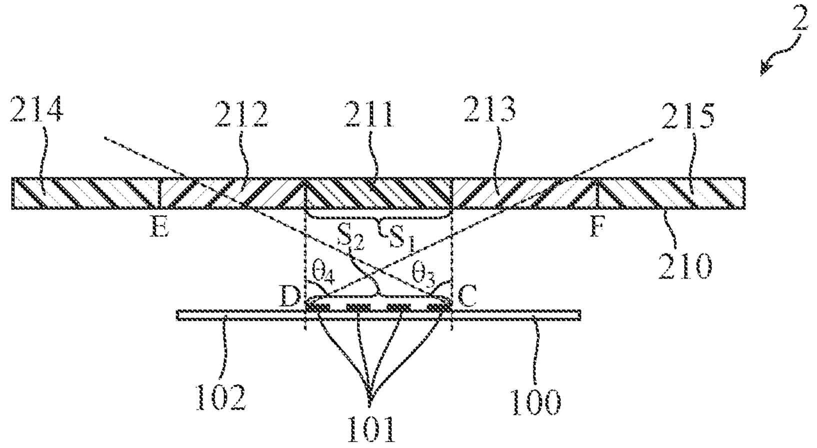
FIG. 3B is a cross-sectional view showing a configuration of the antenna device according to the second embodiment.

FIG. 3A is a plan view showing a configuration of an antenna device 2 according to the second embodiment. FIG. 3B is a cross-sectional view of the antenna device 2 whose cross section is a plane cut along a dotted line $\alpha_2$ of FIG. 3A. As shown in FIGS. 3A and 3B, the antenna device 2 according to the second embodiment differs from the antenna device 1 according to the first embodiment in that the radome 210 further includes a fourth part 214 and a fifth part 215 in addition to the first part 211, the second part 212, and the third part 213, and the size of a surface $S_1$ of the first part 211 facing the beam emitting surface of the planar antenna 100 is equivalent to the size of a beam emitting surface $S_2$ of the planar antenna 100. Note that, the fourth part 214 and the fifth part 215 can be integrally formed so as to surround the first part 211, the second part 212, and the third part 213.

The arrangement of the fourth part 214 and the fifth part 215 will be described below. The radome 210 includes the fourth part 214 adjacent to the end E of the second part 212 and the fifth part 215 adjacent to the end F of the third part 213. Note that, the end E of the second part 212 is the end of the second part 212 opposite to the end adjacent to the first part 211, and the end F of the third part 213 is the end of the third part 213 opposite to the end adjacent to the first part 211. The fourth part 214 is located in a direction of a third scanning angle $\theta_3$ with respect to the planar antenna 100, and the fifth part 215 is located in a direction of a fourth scanning angle $\theta_4$ with respect to the planar antenna 100. More specifically, the end of the fourth part 214 adjacent to the end E of the second part 212 is located in a direction of a scanning angle wider than the third scanning angle $\theta_3$ with respect to one end C of a beam emitting surface composed of the surfaces of a plurality of antenna elements 101 included in the planar antenna 100. The end of the fifth part 215 adjacent to the end F of the third part 213 is located in a direction of a scanning angle wider than the fourth scanning angle $\theta_4$ with respect to the other end D of the beam emitting surface composed of the surfaces of a plurality of antenna elements 101 included in the planar antenna 100. Further, the second part 212 is located between the first part 211 and the fourth part 214 defined as described above, and the third part 213 is located between the first part 211 and the fifth part 215 defined as described above.

Next, the beam transmission characteristics of the first part 211, the second part 212, the third part 213, the fourth part 214, and the fifth part 215 included in the radome 210 will be described. The first part 211 of the radome 210 has a beam transmission characteristic corresponding to a scanning angle of 0 degrees of the beam emitted by the planar antenna 100 with the emission direction directed toward the first part 211. The fourth part 214 of the radome 210 has a beam transmission characteristic corresponding to the third scanning angle $\theta_3$ of the beam emitted by the planar antenna 100 with the emission direction directed toward the fourth part 214. The fifth part 215 of the radome 210 has a beam transmission characteristic corresponding to the fourth scanning angle $\theta_4$ of the beam emitted by the planar antenna 100 with the emission direction directed toward the fifth part 215. Note that, the second part 212 of the radome 210 has a beam transmission characteristic corresponding to the first scanning angle between the scanning angle of 0 degrees and the third scanning angle $\theta_3$. The fifth part 215 of the radome 210 has a beam transmission characteristic corresponding to the second scanning angle between the scanning angle of 0 degrees and the fourth scanning angle $\theta_4$.

Figure 4:
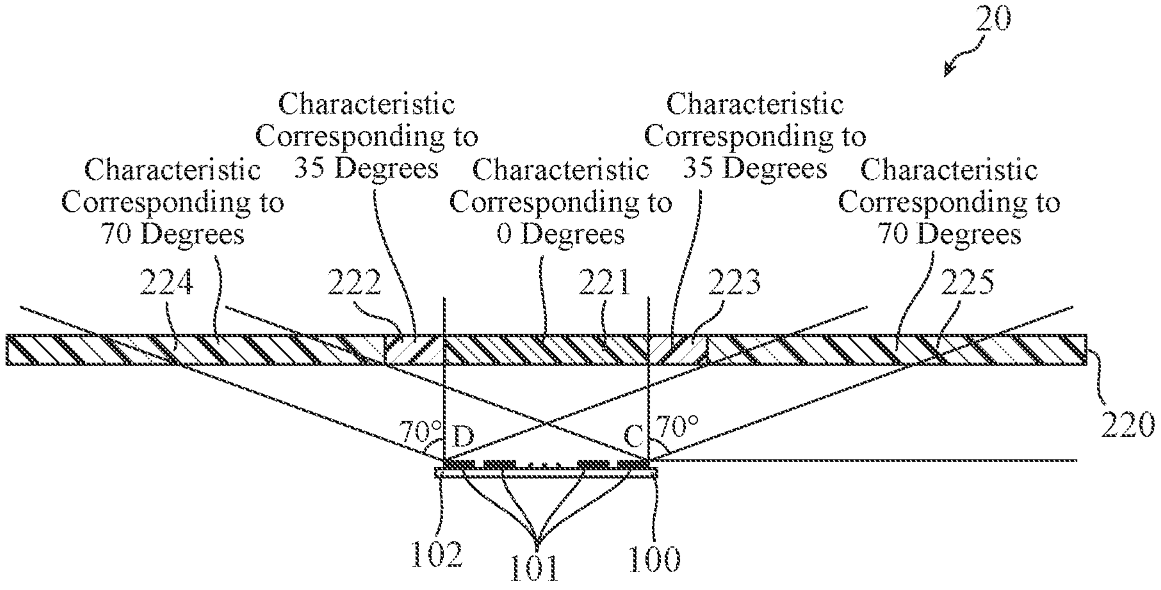
FIG. 4 is a cross-sectional view showing a configuration of an antenna device according to a specific example of the second embodiment.

Next, a specific example of the antenna device 2 according to the second embodiment will be described by referring to the drawings. FIG. 4 is a cross-sectional view showing a configuration of an antenna device 20 according to a specific example of the second embodiment. In the antenna device 20, the end of a fourth part 224 adjacent to the end E of a second part 222 is located in a direction of a scanning angle narrower than a scanning angle of 70 degrees with respect to the other end D of the beam emitting surface composed of the surfaces of a plurality of antenna elements 101 included in the planar antenna 100. The end of a fifth part 225 adjacent to the end F of a third part 223 is located in a direction of a scanning angle narrower than a scanning angle of −70 degrees with respect to one end C of a beam emitting surface composed of the surfaces of a plurality of antenna elements 101 included in the planar antenna 100. Further, the planar antenna 100 of the antenna device 20 includes a plurality of 12×12 antenna elements 101.

The beam transmission characteristics of the first part 221, the second part 222, the third part 223, the fourth part 224, and the fifth part 225 included in the radome 220 will be described below. The first part 221 of the radome 220 has a beam transmission characteristic corresponding to a scanning angle of 0 degrees of the beam emitted by the planar antenna 100 with the emission direction directed toward the first part 221. The second part 222 of the radome 220 has a beam transmission characteristic corresponding to a first scanning angle of 35 degrees of the beam emitted by the planar antenna 100 with the emission direction directed toward the second part 222. The third part 223 of the radome 220 has a beam transmission characteristic corresponding to a second scanning angle of −35 degrees of the beam emitted by the planar antenna 100 with the emission direction directed toward the third part 223.

The fourth part 224 of the radome 220 has a beam transmission characteristic corresponding to a third scanning angle of 70 degrees of the beam emitted by the planar antenna 100 with the emission direction directed toward the fourth part 224. The fifth part 225 of the radome 220 has a beam transmission characteristic corresponding to a fourth scanning angle of −70 degrees of the beam emitted by the planar antenna 100 with the emission direction directed toward the fifth part 225.

Figure 5:
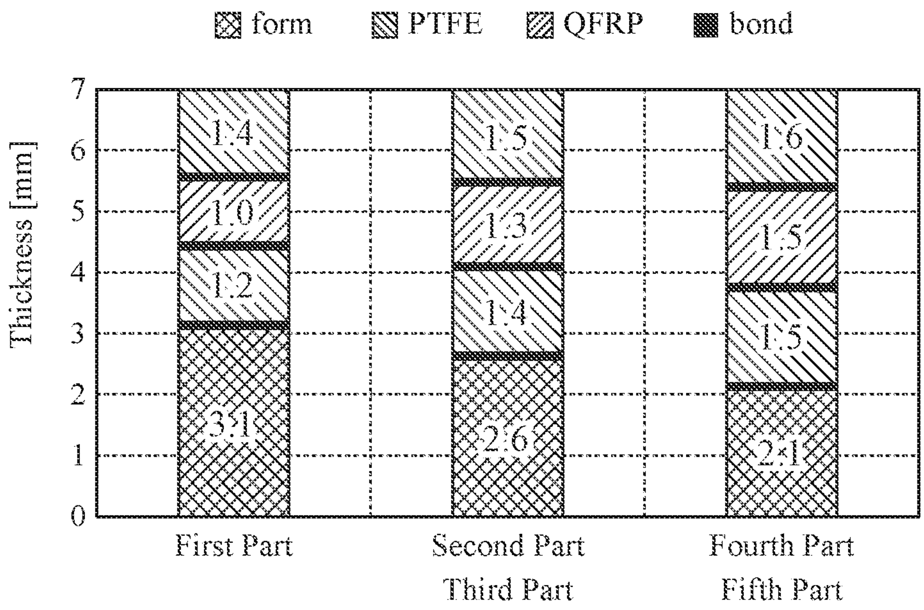
FIG. 5 is a graph showing a layer structure of a radome according to a specific example of the second embodiment.

FIG. 5 is a graph showing a layer structure of the radome 220 according to a specific example of the second embodiment. The bar graph on the left side of FIG. 5 shows each layer of the first part 221, the bar graph in the middle of FIG. 5 shows each layer of the second part 222 and the third part 223, and the bar graph on the right side of FIG. 5 shows each layer of the fourth part 224 and the fifth part 225. The vertical axis of FIG. 5 shows the thickness of the layer in each part.

As shown in FIG. 5, the first part 221 is composed of a PTFE (polytetrafluoroethylene) layer having a thickness of 1.4 mm, a QFRP (Quartz Fiber Reinforced Plastic) layer having a thickness of 1.0 mm, a PTFE layer having a thickness of 1.2 mm, and a form layer having a thickness of 3.1 mm. Note that, the form layer is a base layer for depositing each of the above layers, and is formed of a dielectric different from PTFE and QFRP. In addition, each of these layers is bonded with an adhesive shown as bond in FIG. 5. The first part 221 is composed of a plurality of layers of the above-mentioned material and thickness, and thus has a beam transmission characteristic corresponding to a scanning angle of 0 degrees of the beam emitted by the planar antenna 100 toward the first part 221.

As shown in FIG. 5, each of the second part 222 and the third part 223 is composed of a PTFE layer having a thickness of 1.5 mm, a QFRP layer having a thickness of 1.3 mm, a PTFE layer having a thickness of 1.4 mm, and a form layer having a thickness of 2.6 mm. Note that each of these layers is bonded with an adhesive. The second part 222 is composed of a plurality of layers of the above-mentioned material and thickness, and thus has a beam transmission characteristic corresponding to a scanning angle of 35 degrees of the beam emitted by the planar antenna 100 toward the second part 222. The third part 223 is composed of a plurality of layers of the above-mentioned material and thickness, and thus has a beam transmission characteristic corresponding to a scanning angle of −35 degrees of the beam emitted by the planar antenna 100 toward the third part 223.

As shown in FIG. 5, each of the fourth part 224 and the fifth part 225 is composed of a PTFE layer having a thickness of 1.6 mm, a QFRP layer having a thickness of 1.5 mm, a PTFE layer having a thickness of 1.5 mm, and a form layer having a thickness of 2.1 mm. Note that each of these layers is bonded with an adhesive. The fourth part 224 is composed of a plurality of layers of the above-mentioned material and thickness, and thus has a beam transmission characteristic corresponding to a scanning angle of 70 degrees of the beam emitted by the planar antenna 100 toward the fourth part 224. The fifth part 225 is composed of a plurality of layers of the above-mentioned material and thickness, and thus has a beam transmission characteristic corresponding to a scanning angle of −70 degrees of the beam emitted by the planar antenna 100 toward the fifth part 225.

Figure 6:
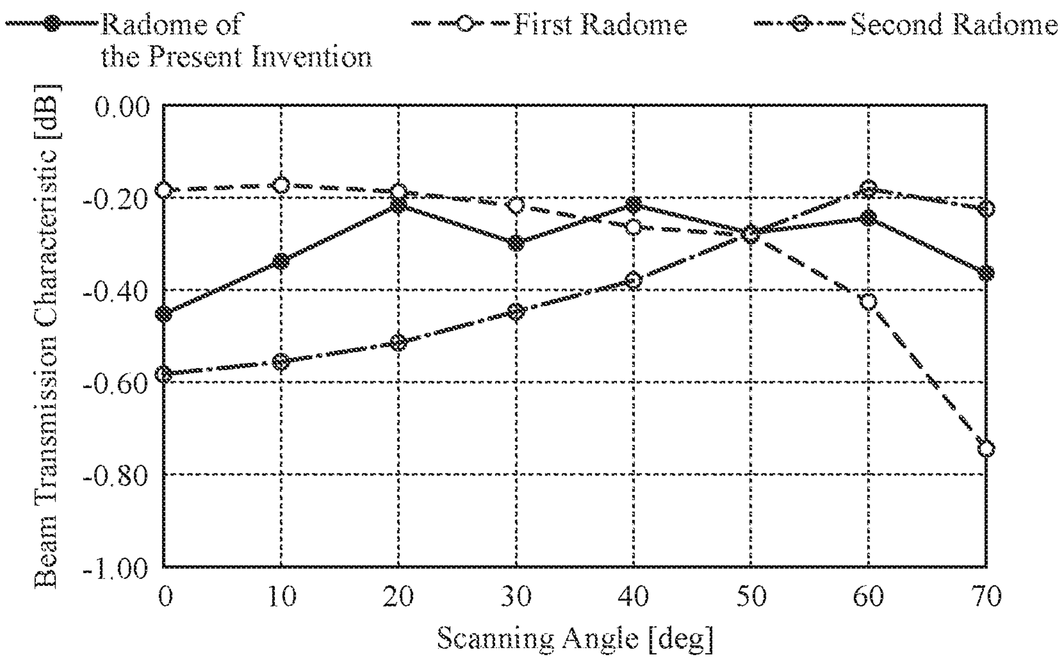
FIG. 6 is a graph showing a beam transmission characteristic of a radome according to a specific example of the second embodiment and a beam transmission characteristic of a radome having a beam transmission characteristic corresponding to a specific scanning angle.

FIG. 6 is a graph showing the beam transmission characteristic of the radome 220 according to the specific example of the second embodiment and the beam transmission characteristic of the radome having the beam transmission characteristic corresponding to a specific scanning angle. The vertical axis of FIG. 6 indicates the degree of attenuation of the beam intensity, which is a difference between the intensity of the beam after passing through the radome and the intensity of the beam before passing through the radome, as the beam transmission characteristic. The horizontal axis of FIG. 6 indicates the scanning angle of the beam emitted by the antenna covered by the radome. The solid line graph in FIG. 6 shows the beam transmission characteristic of the radome 220, and one of the two dotted line graphs shows a beam transmission characteristic of a first radome in which all parts of the radome have the beam transmission characteristic corresponding to the scanning angle of 0 degrees of the beam emitted by the antenna, and the other of the two dotted line graphs shows a beam transmission characteristic of a second radome in which all parts of the radome have the beam transmission characteristic corresponding to the scanning angle of 70 degrees of the beam emitted by the antenna. As shown in FIG. 6, the beam transmission characteristic of the radome 220 more easily transmits the beam for a scanning angle of 0 degrees than a second beam transmission characteristic due to the smaller degree of attenuation of the beam intensity. Further, as shown in FIG. 6, the beam transmission characteristic of the radome 220 more easily transmits the beam for a scanning angle of 35 degrees than the second beam transmission characteristic due to the smaller degree of attenuation of the beam intensity. Further, as shown in FIG. 6, the beam transmission characteristic of the radome 220 more easily transmits the beam for a scanning angle of 70 degrees than a first beam transmission characteristic due to the smaller degree of attenuation of the beam intensity. As described above, the radome 220 has a beam transmission characteristic corresponding to a wider scanning angle than the first radome and the second radome.

Figure 7A:
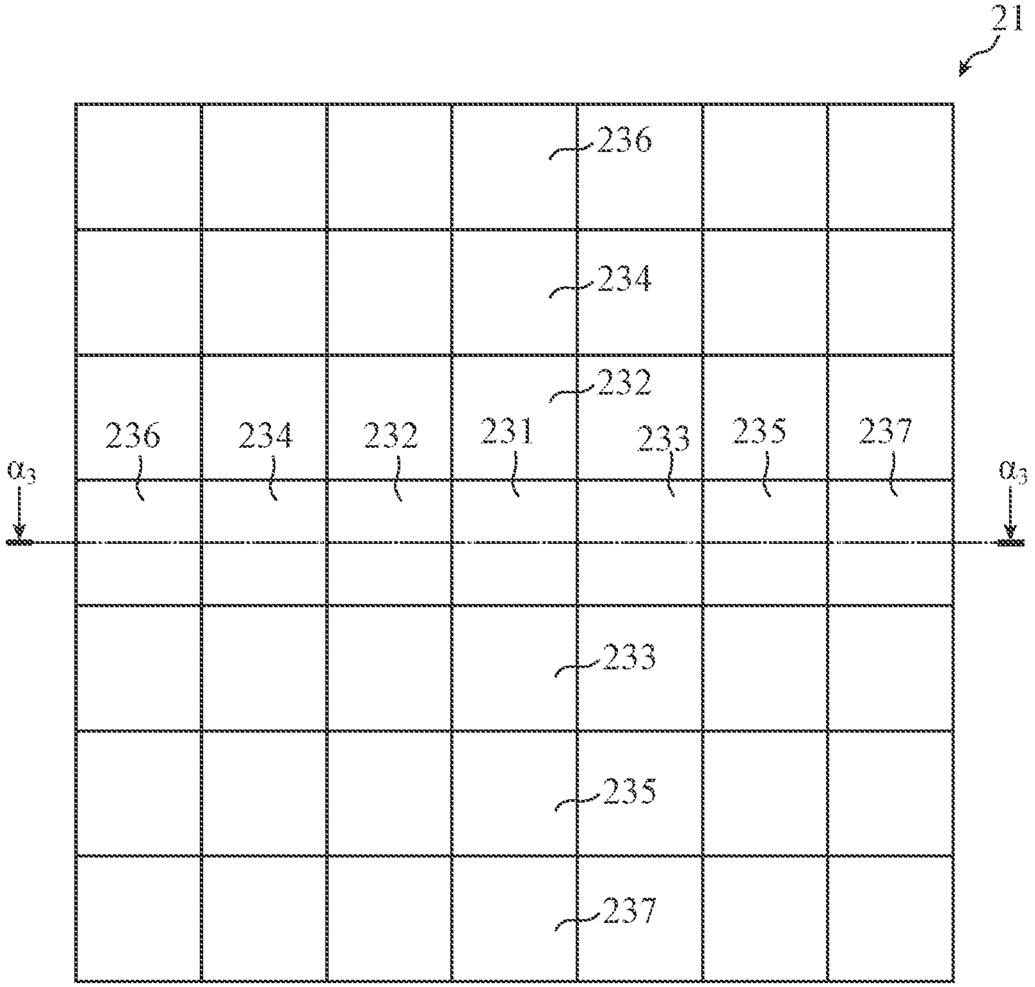
FIG. 7A is a plan view showing a configuration of an antenna device according to a modified example of the second embodiment.
Figure 7B:
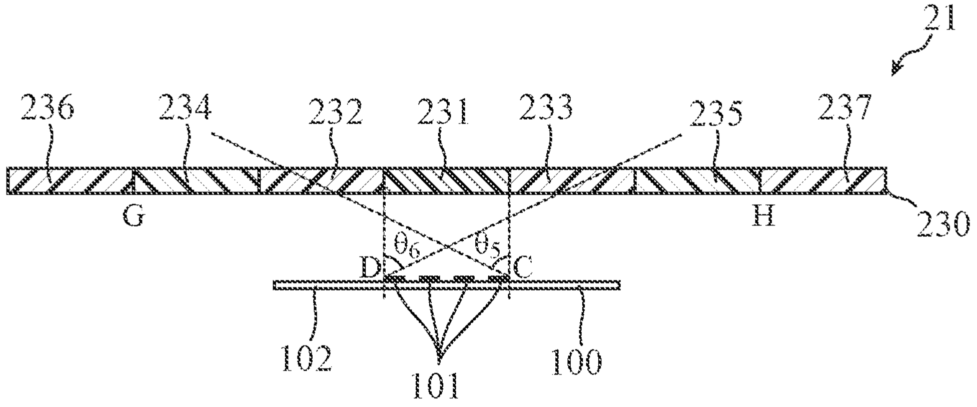
FIG. 7B is a cross-sectional view showing the configuration of the antenna device according to the modified example of the second embodiment.

Next, a modified example of the second embodiment will be described by referring to the drawings. FIG. 7A is a plan view showing a configuration of an antenna device 21 according to the modified example of the second embodiment. FIG. 7B is a cross-sectional view of the antenna device 21 whose cross section is a plane cut along a dotted line $\alpha_3$ of FIG. 7A. As shown in FIGS. 7A and 7B, in the antenna device 21, a radome 230 further includes, in addition to a first part 231, a second part 232, a third part 233, a fourth part 234, and a fifth part 235, a sixth part 236 and a seventh part 237 each having a surface flush with each surface of these parts. More specifically, the radome 230 includes a sixth part 236 adjacent to the end G of the fourth part 234 and a seventh part 237 adjacent to the end H of the fifth part 235. Note that, the end G of the fourth part 234 is the end of the fourth part 234 opposite to the end adjacent to the second part 232, and the end H of the fifth part 235 is the end of the fifth part 235 opposite to the end adjacent to the third part 233. Note that, the sixth part 236 and the seventh part 237 can be integrally formed so as to surround the first part 231, the second part 232, the third part 233, the fourth part 234, and the fifth part 235.

The sixth part 236 is located in a direction of a fifth scanning angle $\theta_5$ with respect to the planar antenna 100, and the seventh part 237 is located in a direction of a sixth scanning angle $\theta_6$ with respect to the planar antenna 100. More specifically, the end of the sixth part 236 adjacent to the end G of the fourth part is located in a direction of a scanning angle wider than the direction of the fifth scanning angle $\theta_5$ with respect to one end C of the beam emitting surface composed of the surfaces of the plurality of antenna elements 101 included in the planar antenna 100. The end of the seventh part 237 adjacent to the end H of the fifth part 235 is located in a direction of a scanning angle wider than the sixth scanning angle $\theta_6$ with respect to the other end D of the beam emitting surface composed of the surfaces of the plurality of antenna elements 101 included in the planar antenna 100.

The sixth part 236 has a beam transmission characteristic corresponding to the fifth scanning angle $\theta_5$ of the beam emitted by the planar antenna 100 with the emission direction directed toward the sixth part 236. The seventh part 237 of the radome 230 has a beam transmission characteristic corresponding to the sixth scanning angle $\theta_6$ of the beam emitted by the planar antenna 100 with the emission direction directed toward the seventh part 237.

As described above, there is no limitation on the number of parts that the radome according to the second embodiment further includes other than the first part, the second part, and the third part. When the number is singular, one part that the radome according to the second embodiment further includes other than the first part, the second part, and the third part has a beam transmission characteristic corresponding to a predetermined scanning angle of the beam emitted by the planar antenna 100 with the emission direction directed toward the one part. When the number is plural, any part of the plurality of parts that the radome according to the second embodiment further includes other than the first part, the second part, and the third part has a beam transmission characteristic corresponding to a predetermined scanning angle of the beam emitted by the planar antenna 100 with the emission direction directed toward the any part.

As described above, in the antenna device 2 according to the second embodiment, the radome 210 further includes one or more parts each having a surface flush with each surface of the first part 211, the second part 212, and the third part 213, and any part of the one or more parts has a beam transmission characteristic corresponding to a predetermined scanning angle of the beam emitted by the planar antenna 100 with the emission direction directed toward the any part.

According to the above configuration, in a region where the one or more parts are arranged, the one or more parts cover the planar antenna 100. This makes it possible to suppress the attenuation of the beam intensity of the beam emitted toward the region while protecting the planar antenna 100 from the external environment such as wind, rain, or dust from the region.

Further, in the antenna device 2 according to the first embodiment, the first part 211 has a surface facing the beam emitting surface of the planar antenna 100, and the size of the surface of the first part 211 is equivalent to the size of the beam emitting surface of the planar antenna 100.

According to the above configuration, the first part 211 covers the planar antenna 100 in a region having a size equivalent to the size of the beam emitting surface of the planar antenna 100. This makes it possible to suppress the attenuation of the beam intensity of the beam emitted toward the region without changing the thickness of the radome in the region.

Third Embodiment

The third embodiment will be described below by referring to the drawings. In the first embodiment and the second embodiment, the configuration in which the antenna covered by the radome is a planar antenna has been described. In the third embodiment, a configuration in which the antenna covered by the radome is an aperture antenna will be described.

Figure 8A:
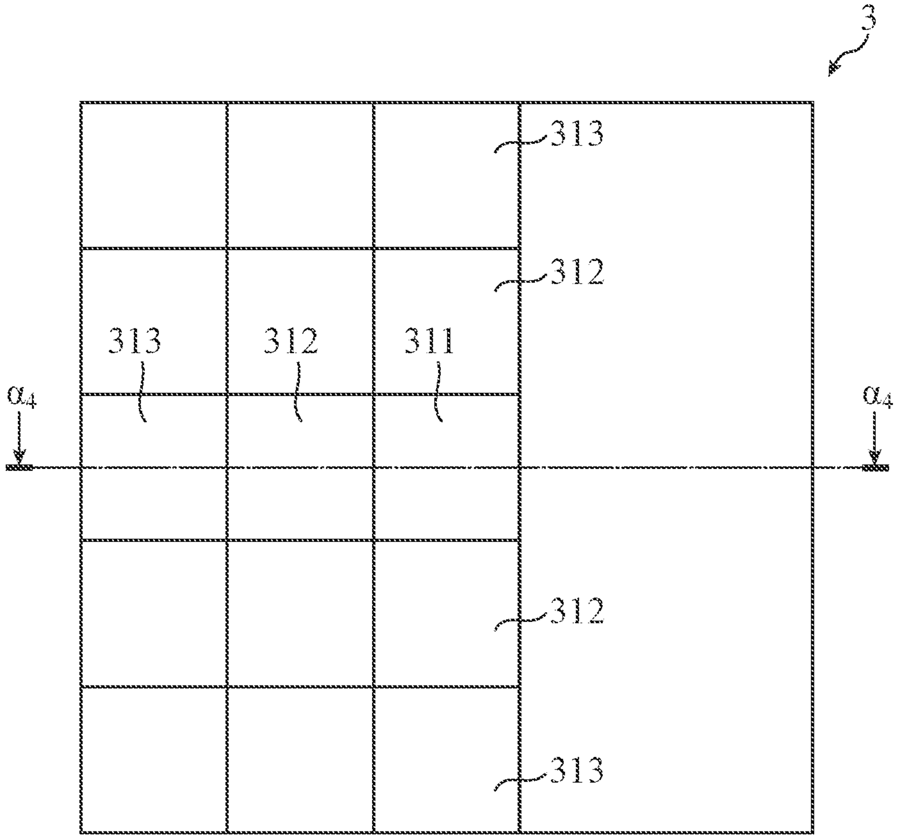
FIG. 8A is a plan view showing a configuration of an antenna device according to a third embodiment.
Figure 8B:
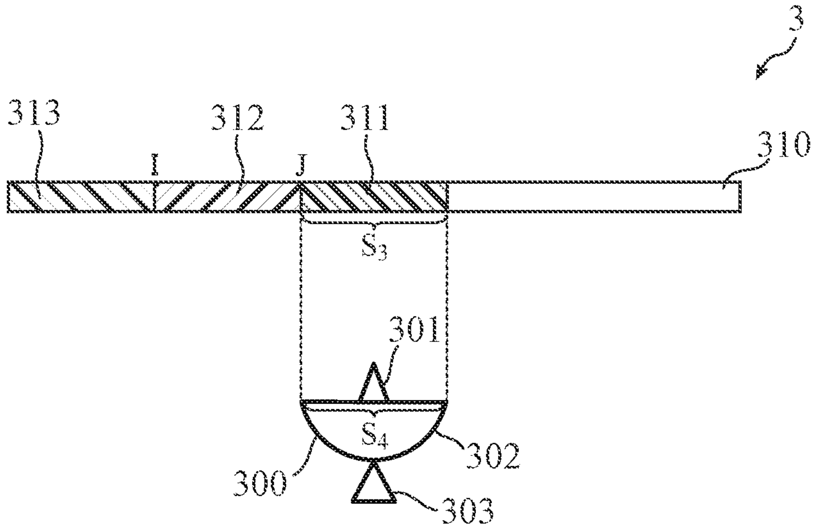
FIG. 8B is a cross-sectional view showing the configuration of the antenna device according to the third embodiment.

FIG. 8A is a plan view showing a configuration of an antenna device 3 according to the third embodiment. FIG. 8B is a cross-sectional view of the antenna device 3 whose cross section is a plane cut along a dotted line $\alpha_4$ of FIG. 8A. As shown in FIGS. 8A and 8B, the antenna device 3 according to the third embodiment differs from the antenna device 1 according to the first embodiment in that the antenna device 3 includes a parabolic antenna 300, which is an aperture antenna, instead of a planar antenna, and mutual arrangement of a first part 311, a second part 312, and a third part 313 of the radome 310 is different from each other. Note that, the second part 312 can be integrally formed so as to surround the first part 231. The third part 313 can be integrally formed so as to surround the second part 312.

The parabolic antenna 300 includes a primary radiator 301, a reflection mirror 302 facing the primary radiator 301, and a base 303 connected to the reflection mirror 302. The primary radiator 301 radiates a beam to the reflection mirror 302, and the reflection mirror 302 reflects the beam radiated by the primary radiator 301 toward the radome 310. The configuration including the primary radiator 301 and the reflection mirror 302 can change the scanning angle of the emitted beam by rotating around the contact point with the base 303.

The third part 313 of the radome 310 is adjacent to one end I of the second part 312, and the first part 311 is adjacent to the other end J of the second part 312. The first part 311 of the radome 310 has a surface $S_3$ facing an aperture plane $S_4$ of the parabolic antenna 300 when the aperture plane $S_4$ of the parabolic antenna 300 is directed toward the first part 311 as shown in FIG. 8B, and the size of the surface $S_3$ of the first part 311 is equivalent to the size of the aperture plane $S_4$ of the parabolic antenna 300.

Figure 9:
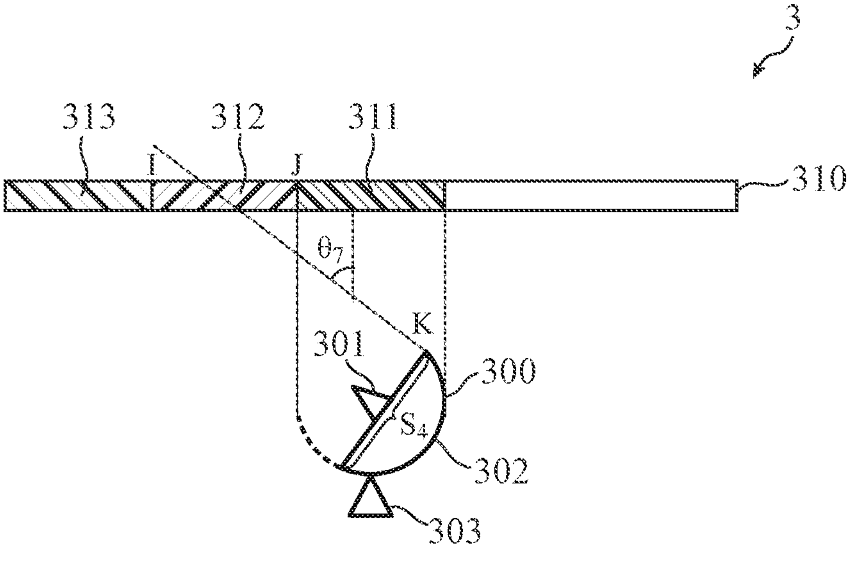
FIG. 9 is a cross-sectional view showing a configuration of a parabolic antenna when an aperture plane is directed to a third part.

Next, the configuration when the aperture plane $S_4$ of the parabolic antenna 300 is directed toward the third part 313 will be described. FIG. 9 is a cross-sectional view showing a configuration when the aperture plane $S_4$ of the parabolic antenna 300 is directed toward the third part 313. The first part 311 is located in the direction of the scanning angle of 0 degrees with respect to the parabolic antenna 300, the second part 312 is located in the direction of the first scanning angle with respect to the parabolic antenna 300, and the third part 313 is located in the direction of a second scanning angle $\theta_7$ with respect to the parabolic antenna 300. Note that, the first scanning angle is a scanning angle between the second scanning angle $\theta_7$ and the scanning angle of 0 degrees. More specifically about mutual arrangement of the first part 311, the second part 312, and the third part 313, the end of the third part 313 adjacent to one end I of the second part 312 is located in a direction of a scanning angle wider than the second scanning angle $\theta_7$ with respect to one end K of the aperture plane $S_4$ of the parabolic antenna 300.

The beam transmission characteristics of the first part 311, the second part 312, and the third part 313 of the radome 310 will be described below. The first part 311 of the radome 310 has a beam transmission characteristic corresponding to a scanning angle of 0 degrees of the beam emitted by the parabolic antenna 300 with the emission direction directed toward the first part 311.

The second part 312 of the radome 310 has a beam transmission characteristic corresponding to the first scanning angle of the beam emitted by the parabolic antenna 300 with the emission direction directed toward the second part 312. The third part 313 of the radome 310 has a beam transmission characteristic corresponding to the second scanning angle $\theta_7$ of the beam emitted by the parabolic antenna 300 with the emission direction directed toward the third part 313. Note that, the first scanning angle is a scanning angle between the second scanning angle $\theta_7$ and the scanning angle of 0 degrees.

More specifically about the beam transmission characteristics of the first part 311, the second part 312, and the third part 313, each of the first part 311, the second part 312, and the third part 313 is composed of one or more layers. The first part 311 and the second part 312 differ in at least one or more of the number of layers, the material of the layer, and the thickness of each layer when the one or more layers are a plurality of layers, and thus differ in the beam transmission characteristic. The first part 311 and the third part 313 differ in at least one or more of the number of layers, the material of the layer, and the thickness of each layer when the one or more layers are a plurality of layers, and thus differ in the beam transmission characteristic. The second part 312 and the third part 313 differ in at least one or more of the number of layers, the material of the layer, and the thickness of each layer when the one or more layers are a plurality of layers, and thus differ in the beam transmission characteristic.

Figure 10A:
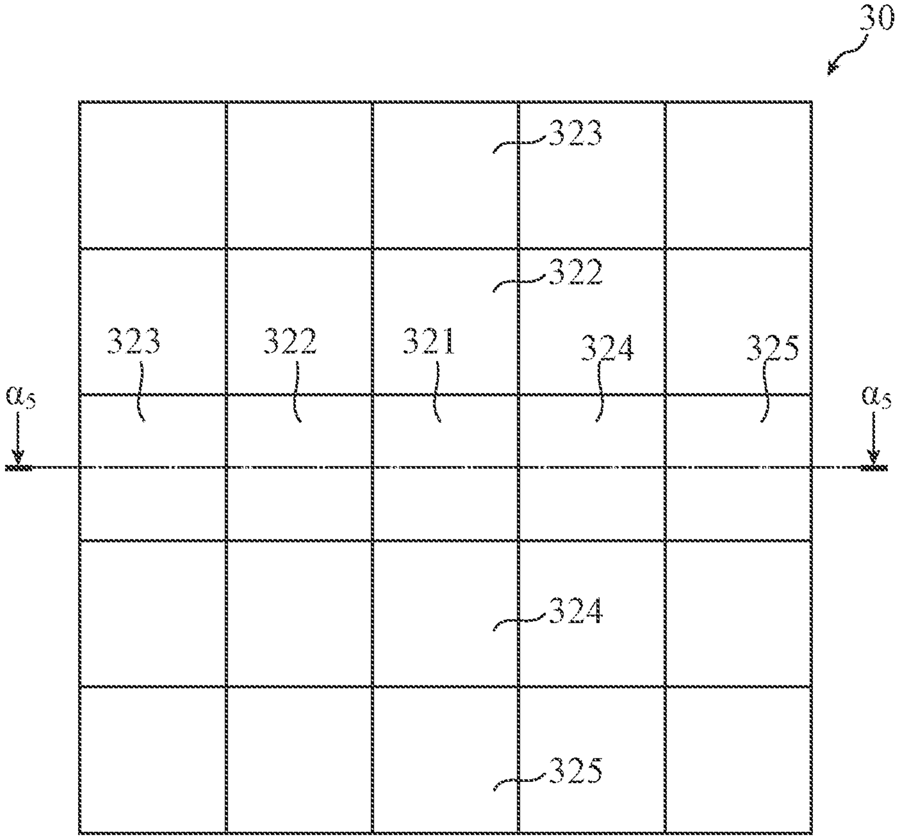
FIG. 10A is a plan view showing a configuration of an antenna device according to a modified example of the third embodiment.
Figure 10B:
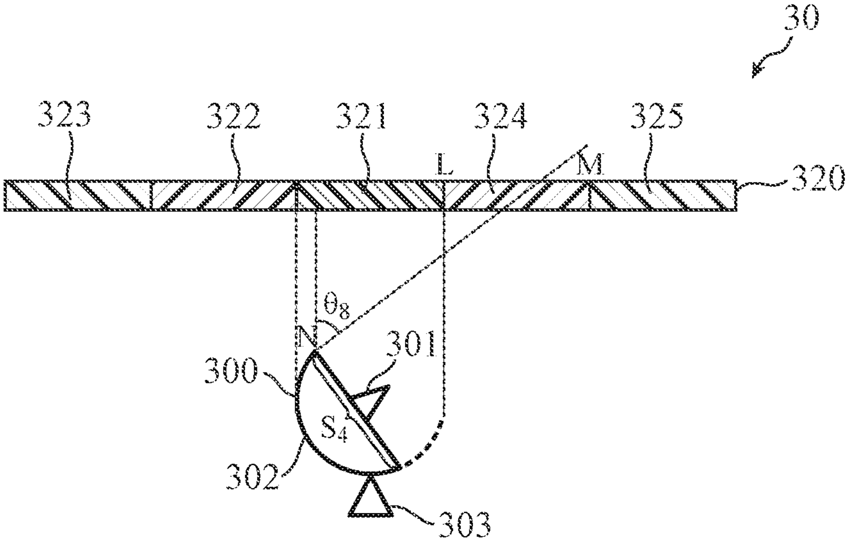
FIG. 10B is a cross-sectional view showing the configuration of the antenna device according to the modified example of the third embodiment.

Next, a modified example of the third embodiment will be described by referring to the drawings. FIG. 10A is a plan view showing a configuration of an antenna device 30 according to the modified example of the third embodiment. FIG. 10B is a cross-sectional view of the antenna device 30 whose cross section is a plane cut along a dotted line as of FIG. 10A. As shown in FIGS. 10A and 10B, in the antenna device 30, a radome 320 further includes, in addition to a first part 321, a second part 322, and a third part 323, a fourth part 324 and a fifth part 325 each having a surface flush with each surface of these parts. In addition, the parabolic antenna 300 has the aperture plane $S_4$ directed toward the fifth part 325. More specifically about the arrangement of the fourth part 324 and the fifth part 325 of the radome 320, the radome 320 includes the fourth part 324 adjacent to the end L of the first part 321, and includes the fifth part 325 adjacent to the end M of the fourth part 324. Note that, the end L of the first part 321 is the end of the first part 321 opposite to the end adjacent to the second part 322, and the end M of the fourth part 324 is the end of the fourth part 324 opposite to the end adjacent to the first part 321. Note that, the fourth part 324 can be integrally formed with the second part 322 so as to surround the first part 321. The fifth part 325 can be integrally formed with the third part 323 so as to surround the second part 322 and the fourth part 324.

The fourth part 324 is located in the direction of the third scanning angle with respect to the parabolic antenna 300, and the fifth part 325 is located in the direction of the fourth scanning angle $\theta_8$ with respect to the parabolic antenna 300. Note that, the third scanning angle is a scanning angle between the fourth scanning angle $\theta_8$ and the scanning angle of 0 degrees. More specifically about mutual arrangement of the fourth part 324 and the fifth part 325, the end of the fifth part adjacent to one end M of the fourth part is located in a direction of a scanning angle wider than the fourth scanning angle $\theta_8$ with respect to the other end N of the aperture plane $S_4$ of the parabolic antenna 300.

The beam transmission characteristics of the fourth part 324 and the fifth part 325 of the radome 320 will be described below. The fourth part 324 of the radome 320 has a beam transmission characteristic corresponding to the third scanning angle of the beam emitted by the parabolic antenna 300 with the emission direction directed toward the fourth part 324. The fifth part 325 of the radome 320 has a beam transmission characteristic corresponding to the fourth scanning angle $\theta_8$ of the beam emitted by the parabolic antenna 300 with the emission direction directed toward the fifth part 325. Note that, the third scanning angle is a scanning angle between the fourth scanning angle $\theta_8$ and the scanning angle of 0 degrees.

As described above, in the antenna device 3 according to the third embodiment, the antenna is a parabolic antenna 300 as an aperture antenna, the third part 313 is adjacent to one end I of the second part 312, and the first part 311 is adjacent to the other end J of the second part 312.

According to the above configuration, in a region adjacent to one end I of the second part 312, the third part 313 covers the aperture antenna, and in a region adjacent to the other end J of the second part 312, the first part 311 covers the aperture antenna. This makes it possible to suppress the attenuation of the beam intensity of the beam emitted toward these regions without providing a step on the surface of the radome while protecting the aperture antenna from the external environment such as wind, rain, or dust from a region adjacent to one end I of the second part 312 and the region adjacent to the other end J of the second part 312.

Further, in the antenna device 3 according to the third embodiment, each of the first part 311, the second part 312, and the third part 313 is composed of one or more layers, the first part 311 and the second part 312 differ in at least one or more of the number of layers, the material of the layer, and the thickness of each layer when the one or more layers are a plurality of layers and thus differ in the beam transmission characteristic, the first part 311 and the third part 313 differ in at least one or more of the number of layers, the material of the layer, and the thickness of each layer when the one or more layers are a plurality of layers and thus differ in the beam transmission characteristic, and the second part 312 and the third part 313 differ in at least one or more of the number of layers, the material of the layer, and the thickness of each layer when the one or more layers are a plurality of layers and thus differ in the beam transmission characteristic.

According to the above configuration, at least one or more of the number of layers, the material of the layer, and the thickness of each layer when the one or more layers are a plurality of layers are made different from each other, and thereby it is possible to suppress the attenuation of the beam intensity depending on the scanning angle of the beam in the radome without providing a step on the surface of the radome.

Further, in the antenna device 3 according to the third embodiment, the first part 311 is located in the direction of a scanning angle of 0 degrees with respect to the aperture antenna, the second part 312 is located in the direction of the first scanning angle between the second scanning angle and the scanning angle of 0 degrees with respect to the aperture antenna, and the third part 313 is located in the direction of the second scanning angle $\theta_7$ with respect to the aperture antenna.

According to the above configuration, the first part 311 is disposed so as to suppress the attenuation of the beam intensity when the aperture antenna emits a beam in the direction of a scanning angle of 0 degrees. The second part 312 is disposed so as to suppress the attenuation of the beam intensity when the aperture antenna emits a beam in the direction of the first scanning angle. The third part 313 is disposed so as to suppress the attenuation of the beam intensity when the aperture antenna emits a beam in the direction of the second scanning angle $\theta_7$. This makes it possible to suppress the attenuation of the beam intensity depending on the scanning angle of the beam in the radome.

Further, in the antenna device 3 according to the third embodiment, the first part 311 has a surface facing the aperture plane $S_4$ when the aperture plane $S_4$ of the aperture antenna is directed toward the first part 311, and the size of the surface of the first part 311 is equivalent to the size of the aperture plane $S_4$ of the aperture antenna.

According to the above configuration, the first part 311 covers the aperture antenna in a region having a size equivalent to the size of the aperture plane $S_4$ of the aperture antenna. This makes it possible to suppress the attenuation of the beam intensity of the beam emitted toward the region while protecting the aperture antenna from the external environment such as wind, rain, or dust from the region.

Fourth Embodiment

The fourth embodiment will be described below by referring to the drawings. In the third embodiment, the configuration in which the antenna covered by the radome is a parabolic antenna as an aperture antenna has been described. In the fourth embodiment, a configuration in which the antenna covered by the radome is a horn antenna as an aperture antenna will be described.

Figure 11A:
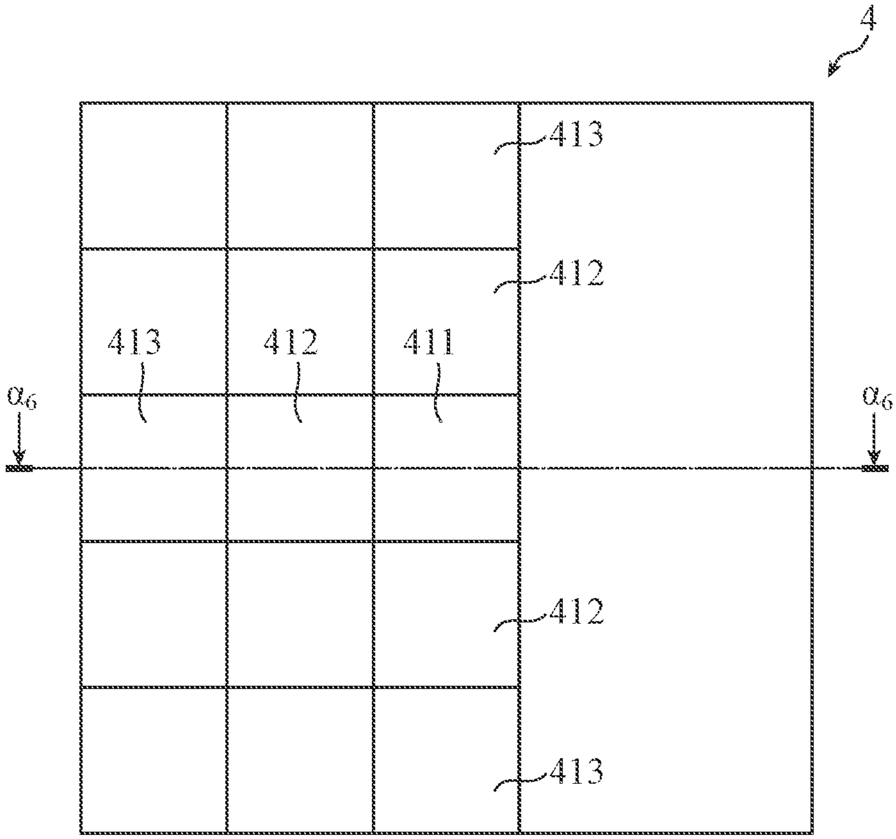
FIG. 11A is a plan view showing a configuration of an antenna device according to a fourth embodiment.
Figure 11B:
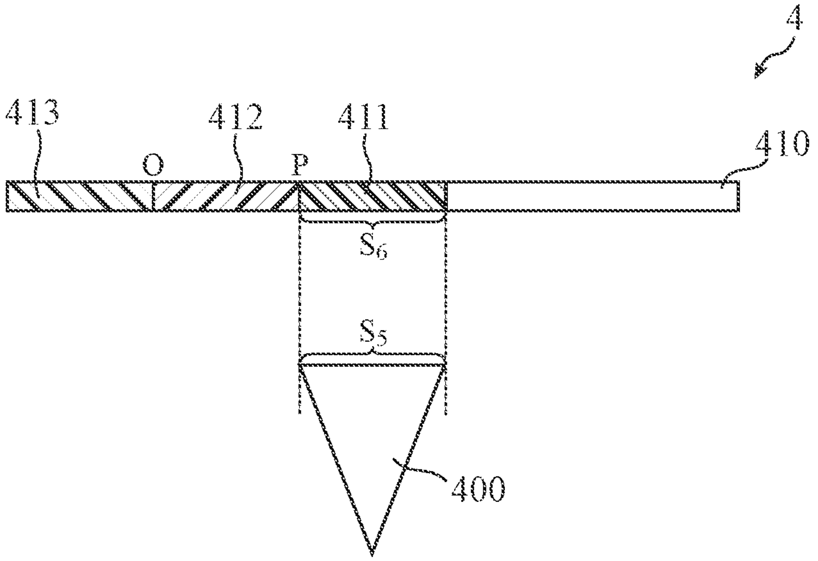
FIG. 11B is a cross-sectional view showing the configuration of the antenna device according to the fourth embodiment.

FIG. 11A is a plan view showing a configuration of an antenna device 4 according to the fourth embodiment. FIG. 11B is a cross-sectional view of the antenna device 4 whose cross section is a plane cut along a dotted line $\alpha_6$ of FIG. 11B. As shown in FIGS. 11A and 11B, the antenna device 4 according to the fourth embodiment differs from the antenna device 3 according to the third embodiment in that the antenna device 4 includes a horn antenna 400 as an aperture antenna.

The horn antenna 400 emits a beam from an aperture plane $S_5$ toward a radome 410.

A third part 413 of the radome 410 is adjacent to one end 0 of a second part 412, and a first part 411 is adjacent to the other end P of the second part 412. The first part 411 of the radome 410 has a surface $S_6$ facing the aperture plane $S_5$ of the horn antenna 400 when the aperture plane $S_5$ of the horn antenna 400 is directed toward the first part 411 as shown in FIG. 11B, and the size of the surface $S_6$ of the first part 411 is equivalent to the size of the aperture plane $S_5$ of the horn antenna 400.

Figure 12:
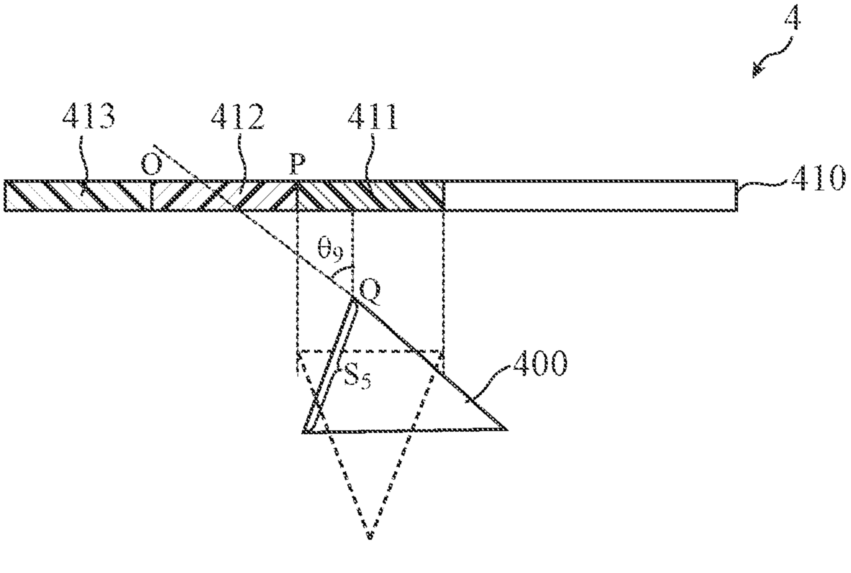
FIG. 12 is a cross-sectional view showing a configuration of a horn antenna when an aperture plane is directed to a third part.

Next, the configuration when the aperture plane $S_5$ of the horn antenna 400 is directed toward the third part 413 will be described. FIG. 12 is a cross-sectional view showing a configuration when the aperture plane $S_5$ of the horn antenna 400 is directed toward the third part 413. The first part 411 is located in the direction of a scanning angle of 0 degrees with respect to the horn antenna 400, the second part 412 is located in the direction of the first scanning angle with respect to the horn antenna 400, and the third part 413 is located in the direction of a second scanning angle $\theta_9$ with respect to the horn antenna 400. Note that, the first scanning angle is a scanning angle between the second scanning angle $\theta_9$ and the scanning angle of 0 degrees. More specifically about mutual arrangement of the first part 411, the second part 412, and the third part 413, the end of the third part 413 adjacent to one end O of the second part 412 is located in the direction of a scanning angle wider than the second scanning angle $\theta_9$ with respect to one end Q of the aperture plane $S_5$ of the horn antenna 400.

The beam transmission characteristics of the first part 411, the second part 412, and the third part 413 of the radome 410 will be described below. The first part 411 of the radome 410 has a beam transmission characteristic corresponding to a scanning angle of 0 degrees of the beam emitted by the horn antenna 400 with the emission direction directed toward the first part 411.

The second part 412 of the radome 410 has a beam transmission characteristic corresponding to the first scanning angle of the beam emitted by the horn antenna 400 with the emission direction directed toward the second part 412. The third part 413 of the radome 410 has a beam transmission characteristic corresponding to the second scanning angle $\theta_9$ of the beam emitted by the horn antenna 400 with the emission direction directed toward the third part 413. Note that, the first scanning angle is a scanning angle between the second scanning angle $\theta_9$ and the scanning angle of 0 degrees.

More specifically about the beam transmission characteristics of the first part 411, the second part 412, and the third part 413, each of the first part 411, the second part 412, and the third part 413 is composed of one or more layers. The first part 411 and the second part 412 differ in at least one or more of the number of layers, the material of the layer, and the thickness of each layer when the one or more layers are a plurality of layers, and thus differ in the beam transmission characteristic. The first part 411 and the third part 413 differ in at least one or more of the number of layers, the material of the layer, and the thickness of each layer when the one or more layers are a plurality of layers, and thus differ in the beam transmission characteristic. The second part 412 and the third part 413 differ in at least one or more of the number of layers, the material of the layer, and the thickness of each layer when the one or more layers are a plurality of layers, and thus differ in the beam transmission characteristic.

Figure 13A:
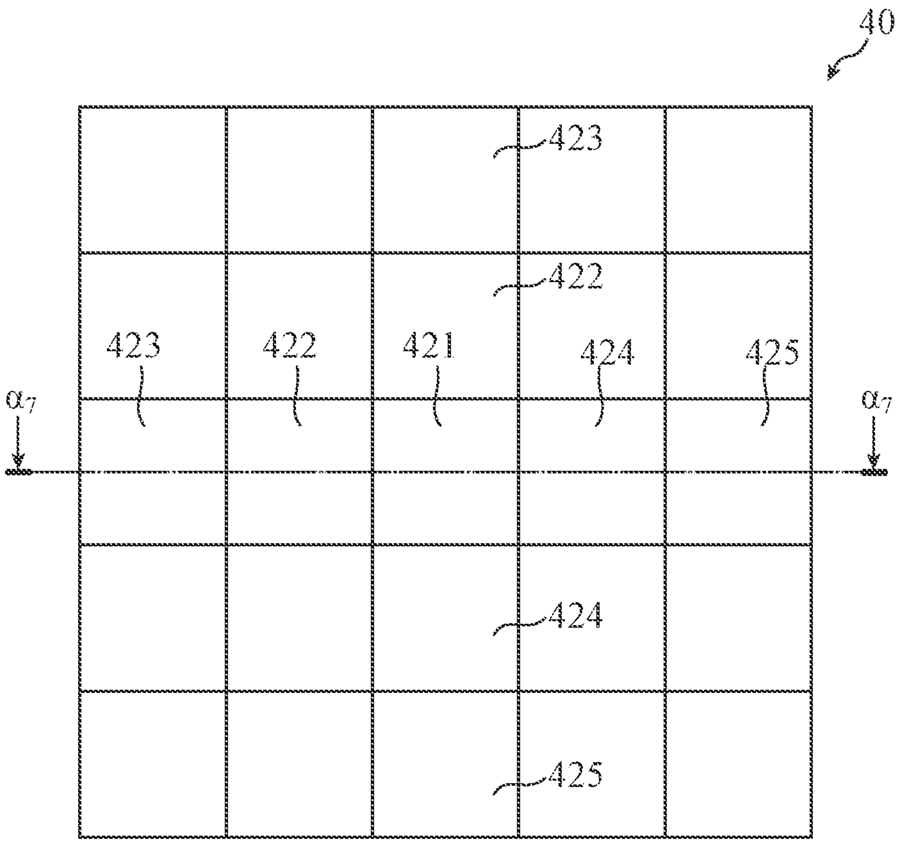
FIG. 13A is a plan view showing a configuration of an antenna device according to a modified example of the fourth embodiment.
Figure 13B:
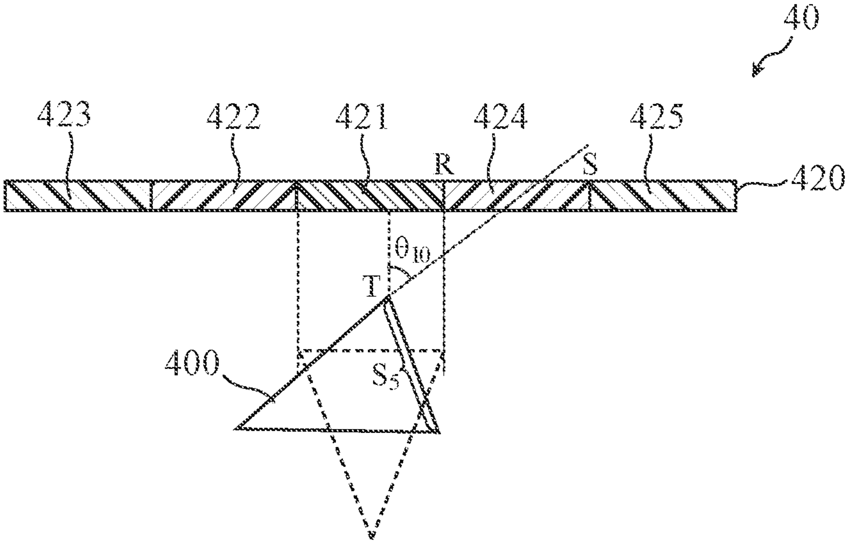
FIG. 13B is a cross-sectional view showing the configuration of the antenna device according to the modified example of the fourth embodiment.

Next, a modified example of the fourth embodiment will be described by referring to the drawings. FIG. 13A is a plan view showing a configuration of an antenna device 40 according to the modified example of the fourth embodiment. FIG. 13B is a cross-sectional view of the antenna device 40 whose cross section is a plane cut along a dotted line $\alpha_7$ of FIG. 13A. As shown in FIGS. 13A and 13B, in the antenna device 40, the radome 420 further includes, in addition to a first part 421, a second part 422, and a third part 423, a fourth part 424 and a fifth part 425 each having a surface flush with each surface of these parts. Further, the horn antenna 400 has the aperture plane $S_5$ directed to the fifth part 425. More specifically about the arrangement of the fourth part 424 and the fifth part 425 of the radome 420, the radome 420 includes the fourth part 424 adjacent to the end R of the first part 421, and includes the fifth part 425 adjacent to the end S of the fourth part 424. Note that, the end R of the first part 421 is the end of the first part 421 opposite to the end adjacent to the second part 422, and the end S of the fourth part 424 is the end of the fourth part 424 opposite to the end adjacent to the first part 421.

The fourth part 424 is located in the direction of the third scanning angle with respect to the horn antenna 400, and the fifth part 425 is located in the direction of the fourth scanning angle $\theta_{10}$ with respect to the horn antenna 400. Note that, the third scanning angle is a scanning angle between the fourth scanning angle $\theta_{10}$ and the scanning angle of 0 degrees. More specifically about mutual arrangement of the fourth part 424 and the fifth part 425, the end of the fifth part adjacent to one end S of the fourth part is located in the direction of a scanning angle wider than the fourth scanning angle $\theta_{10}$ with respect to the other end T of the aperture plane $S_5$ of the horn antenna 400.

The beam transmission characteristics of the fourth part 424 and the fifth part 425 of the radome 420 will be described below. The fourth part 424 of the radome 420 has a beam transmission characteristic corresponding to the third scanning angle of the beam emitted by the horn antenna 400 with the emission direction directed toward the fourth part 424. The fifth part 425 of the radome 420 has a beam transmission characteristic corresponding to the fourth scanning angle $\theta_{10}$ of the beam emitted by the horn antenna 400 with the emission direction directed toward the fifth part 425. Note that, the third scanning angle is a scanning angle between the fourth scanning angle $\theta_{10}$ and the scanning angle of 0 degrees.

As described above, the fourth embodiment shows the configuration in which the aperture antenna covered by the radome 410 is the horn antenna 400. Even with such a configuration, the same effect as that of the antenna device 3 according to the third embodiment is obtained.

It should be noted that the invention of the present application can freely combine the embodiments, modify any constituent element of each embodiment, or omit any constituent element in each embodiment within the scope of the invention.

INDUSTRIAL APPLICABILITY

The antenna device according to the present invention can suppress the attenuation of the beam intensity depending on the scanning angle of the beam emitted by the antenna in the radome without providing a step on the surface of the radome in the antenna device provided with the radome that covers the antenna, and therefore it can be used for antenna devices equipped with a radome that covers the antenna.

REFERENCE SIGNS LIST

1, 2, 3, 4, 20, 21, 30, 40: antenna device, 100: planar antenna, 101: a plurality of antenna elements, 102: dielectric substrate, 110, 120, 130, 140, 150, 210, 220, 230, 310, 320, 410, 420: radome, 111, 121, 131, 141, 151, 211, 221, 231, 311, 321, 411, 421: first part, 112, 122, 132, 142, 152, 212, 222, 232, 312, 322, 412, 422: second part, 113, 123, 133, 143, 153, 213, 223, 233, 313, 323, 413, 423: third part, 214, 224, 234, 324, 424: fourth part, 215, 225, 235, 325, 425: fifth part, 236: sixth part, 237: seventh part, 300: parabolic antenna, 301: primary radiator, 302: reflection mirror, 303: base, 400: horn antenna.

The invention claimed is:

1. An antenna device comprising an antenna and a radome that covers the antenna, wherein:

the antenna includes a substrate and an antenna element;

the radome includes a first part, a second part and a third part each with a surface which is flush to each other, and a surface of the first part, a surface of the second part, and a surface of the third part, opposing the antenna, together forming a single planar surface;

the first part has a beam transmission characteristic corresponding to a scanning angle of 0 degrees of a beam emitted by the antenna with an emission direction directed toward the first part;

the second part has a beam transmission characteristic corresponding to a first scanning angle of a beam emitted by the antenna with an emission direction directed toward the second part; and the third part has a beam transmission characteristic corresponding to a second scanning angle of a beam emitted by the antenna with an emission direction directed toward the third part, wherein:

the antenna is a planar antenna; and the second part is adjacent to one end of the first part, and the third part is adjacent to the other end of the first part, and, wherein:

each of the first part, the second part, and the third part is composed of one or more layers;

the first part and the second part differ in at least one or more of a number of layers, and a thickness of each layer when the one or more layers are a plurality of layers, and thus differ in the beam transmission characteristic; and the first part and the third part differ in at least one or more of a number of layers, and a thickness of each layer when the one or more layers are a plurality of layers, and thus differ in the beam transmission characteristic.

2. The antenna device according to claim 1, wherein:

the first part is located in a direction of a scanning angle of 0 degrees with respect to the planar antenna;

the second part is located in a direction of the first scanning angle with respect to the planar antenna; and the third part is located in a direction of the second scanning angle with respect to the planar antenna.

3. The antenna device according to claim 1, wherein:

the first part has a surface facing a beam emitting surface of the planar antenna; and a size of the surface of the first part is equivalent to a size of the beam emitting surface of the planar antenna.

4. An antenna device comprising an antenna and a radome that covers the antenna, wherein:

the radome includes a first part, a second part and a third part each with a surface which is flush to each other;

the first part has a beam transmission characteristic corresponding to a scanning angle of 0 degrees of a beam emitted by the antenna with an emission direction directed toward the first part;

the second part has a beam transmission characteristic corresponding to a first scanning angle of a beam emitted by the antenna with an emission direction directed toward the second part; and the third part has a beam transmission characteristic corresponding to a second scanning angle of a beam emitted by the antenna with an emission direction directed toward the third part, wherein:

the antenna is an aperture antenna; and the third part is adjacent to one end of the second part, and the first part is adjacent to the other end of the second part, wherein:

each of the first part, the second part, and the third part is composed of one or more layers;

the first part and the second part differ in at least one or more of a number of layers, a material of the layer, and a thickness of each layer when the one or more layers are a plurality of layers, and thus differ in the beam transmission characteristic;

the first part and the third part differ in at least one or more of a number of layers, a material of the layer, and a thickness of each layer when the one or more layers are a plurality of layers, and thus differ in the beam transmission characteristic;

the second part and the third part differ in at least one or more of a number of layers, a material of the layer, and a thickness of each layer when the one or more layers are a plurality of layers, and thus differ in the beam transmission characteristic; and a surface of the first part, a surface of the second part, and a surface of the third part, facing the antenna, form a single planar surface.

5. The antenna device according to claim 4, wherein:

the first part is located in a direction of a scanning angle of 0 degrees with respect to the aperture antenna;

the second part is located in a direction of the first scanning angle between the second scanning angle and the scanning angle of 0 degrees with respect to the aperture antenna; and the third part is located in a direction of the second scanning angle with respect to the aperture antenna.

6. The antenna device according to claim 4, wherein:

the first part has a surface facing an aperture plane when the aperture plane of the aperture antenna is directed toward the first part; and a size of the surface of the first part is equivalent to a size of the aperture plane of the aperture antenna.

7. The antenna device according to claim 1, wherein:

the radome further includes one or more parts each having a surface flush with each surface of the first part, the second part, and the third part; and any part of the one or more parts has a beam transmission characteristic corresponding to a predetermined scanning angle of a beam emitted by the antenna with an emission direction directed toward the any part.

* * * * *